United States Patent [19]
Hurlow

[11] 3,990,321
[45] Nov. 9, 1976

[54] PUSH-PULL, CABLE-TYPE ACTUATOR

[76] Inventor: Robert H. Hurlow, 2901 SW. 164th Place, Seattle, Wash. 98466

[22] Filed: Jan. 28, 1975

[21] Appl. No.: 544,850

[52] U.S. Cl. .............................. 74/501 R; 74/501 P
[51] Int. Cl.² ............................................ F16C 1/10
[58] Field of Search .............. 74/501 R, 501 P, 502; 64/2 R, 2 P

[56] References Cited
UNITED STATES PATENTS
3,063,303  11/1962  Cadwallader .......................... 64/2 R

*Primary Examiner*—Samuel Scott
*Assistant Examiner*—Frank H. McKenzie, Jr.
*Attorney, Agent, or Firm*—Eugene D. Farley

[57] ABSTRACT

A push-pull cable-type actuator comprises a sheath comprising a plurality of sheath strands arranged in side edge-abutting, long-lay helices, the abutting side edges of the strands being wedge shaped, and a motion-transmission core member mounted for guided longitudinal movement within the sheath.

22 Claims, 10 Drawing Figures

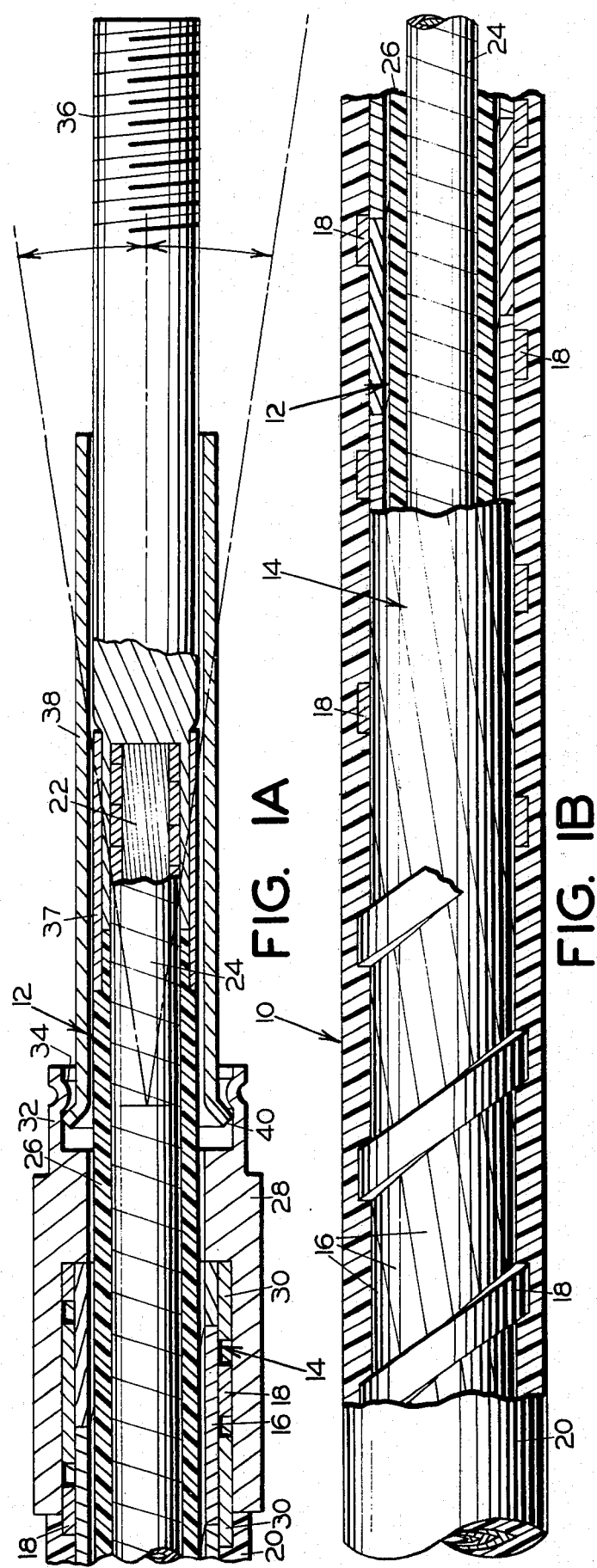

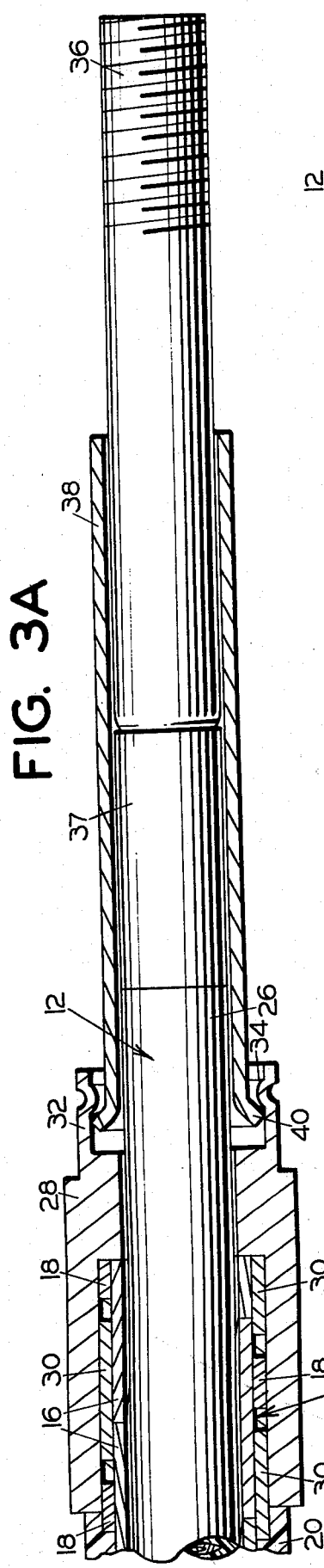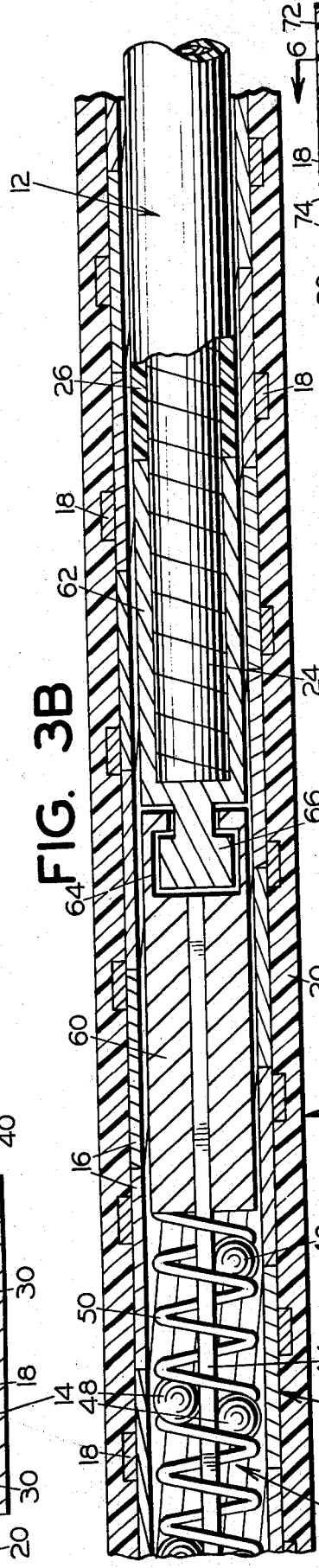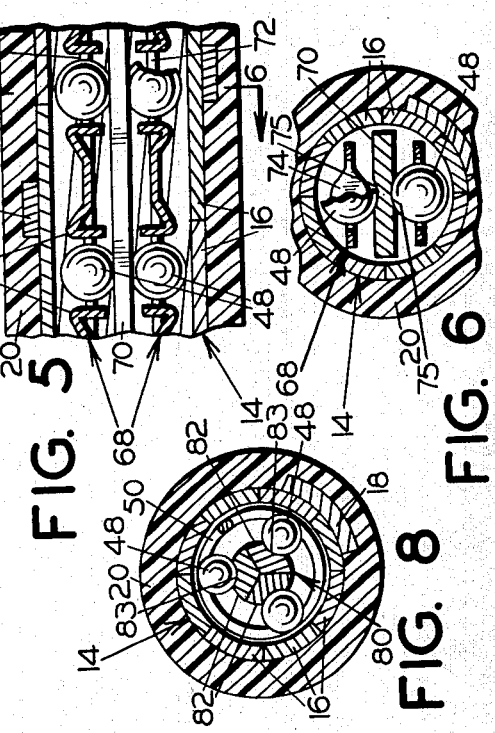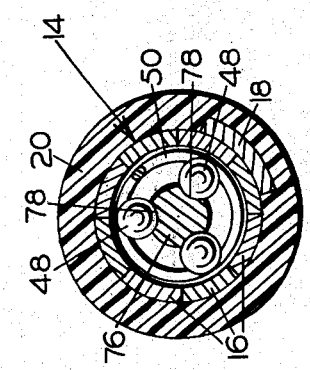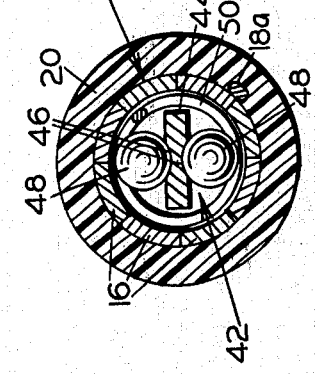

PUSH-PULL, CABLE-TYPE ACTUATOR

BACKGROUND OF THE INVENTION

This invention pertains to push-pull cable-type actuators of the class used as remote control devices. It pertains particularly to push-pull type remote control devices which may be used over long distances in tortuous runs and which may include either a sliding or a ball bearing-mounted power transmission element of simplified construction.

Although there are many types of push-pull cable actuators known to the prior art, there is needed for an actuator of this class which is adaptable for the transmission of high loads without the occurrence of backlash or other mechanical problems. There also is need for a low friction ball bearing-type push-pull cable control of simplified construction which is flexible in all planes.

A typical prior art bearing type push-pull cable control is characterized by the presence of tracks laid inside a tightly wound coiled wire flexible sheath. The tracks provide a smooth surface on which the ball bearings roll. They are undesirable because of their added cost, the difficulty in adjusting the control to different planes of bending, and the need for complicated fittings to secure the ends of the sheath.

Stated in greater detail, the presence of the tracks causes difficulties when bending the conduit because as the bend plane of the conduit is changed, the tracks must move circumferentially within the sheath to allow the motion transmission core member to align with the bent plane. Also, the tracks must be secured at their ends to transmit axial load to the sheath. Since bending creates a differential length between the two tracks, the extent of bending of the sheath is restricted correspondingly. Still further, the securing means for the tracks creates a gap in the ball bearings at the full extension of the motion transmission core member. This in turn reduces the compression capability of the core member.

As a substitute for the tracks of the above described ball bearing type control the use of a plastic sheath has been suggested. The use of such a sheath provides a smooth surface for the operation of the ball bearings, and allows unlimited flexing. However, the low bearing stress capability of plastics severely limits the allowable load that may be transmitted by such a control.

The use of a metal tube as the sheath will overcome the latter problem and permit high loads to be transmitted. However, a metal sheath is not sufficiently flexible to allow easy installation and efficient operation.

It is the general purpose of the present invention to provide a push-pull, cable-type actuator which overcomes the foregoing problems and which permits the efficient use of a ball bearing-mounted central core, or power transmission member, while retaining a high degree of actuator flexibility and strength.

It is another object of the present invention to provide a push-pull, cable-type actuator which is universally applicable for use with both ball bearing type and sliding type core members, or with combinations of both.

Another important object of the present invention is the provision of a ball bearing type push-pull actuator which is of simplified construction and which accordingly is of relatively low cost.

Still a further object of the present invention is the provision of a push-pull cable-type actuator which may be used to transmit high loads over great distances; which is universally applicable too both straight line and devious courses of application; and which is free from backlash and other operating difficulties.

GENERAL STATEMENT OF THE INVENTION

Basically considered, the push-pull cable-type actuator of my invention comprises a flexible sheath comprising a plurality of sheath strands arranged in side edge-abutting, long-lay helices, the abutting side edges of the strands being wedge-shaped in transverse cross section. This provides a smooth, uniform bore which per se provides a tracking surface for the ball bearings of a ball bearing-type power transmission core member, thereby eliminating the need for separate tracks. It also provides a sliding surface for core members of the sliding type.

The sheath assembly includes at least one binder strand of a shorter lay than the sheath strands. This is wrapped helically about the sheath strands in counter rotation thereto. The resulting sheath assembly resists both tension and compression stresses. In tension, the sheath is prevented from collapsing inwardly because of the keystone effect of its component wedge-shaped strands. In compression, the sheath strands are prevented from buckling outwardly by the retaining effect of the binder strand.

DESCRIPTION OF PREFERRED EMBODIMENTS OF THE INVENTION

Considering the foregoing in greater detail and with particular reference to the drawings wherein:

FIG. 1A is a fragmentary view in longitudinal section of the hereindescribed push-pull cable-type actuator in a first embodiment, and in particular with a sliding type motion transmission core member.

FIG. 1B is a continuation of FIG. 1A being partly in side elevation, partly broken away, and partly in longitudinal section.

FIG. 2 is a fragmentary view in longitudinal section similar to FIG. 1A, but illustrating the actuator of the invention in a second embodiment, and in particular with a ball bearing type motion transmission core member.

FIG. 3A and FIG. 3B are continuation views in side elevation, partly in section, illustrating a push-pull, cable-type actuator of the invention in a third embodiment, and in particular one in which a combination ball bearing type and sliding type motion transmission core member is employed.

FIG. 4 is a transverse sectional view taken along lines 4—4 of FIG. 2.

FIG. 5 is a fragmentary view in longitudinal section illustrating a second form of ball bearing type motion transmission core member which may be used in the actuator of the present invention.

FIG. 6 is a fragmentary transverse section taken along line 6—6 of FIG. 5.

FIGS. 7 and 8 are views in transverse section similar to FIG. 6 but illustrating, respectively, alternate types of ball bearing type motion transmission core members which may be used in the hereindescribed push-pull, cable-type actuator assembly.

FIGS. 1A and 1B illustrate a push-pull, cable-type actuator of the invention incorporating a sliding type of motion-transmission core member.

The actuator broadly comprises a novel external sheath indicated generally at 10 and a sliding type motion transmission core member indicated generally at 12.

Sheath 10 is characterized by having a hard, uniform, smooth-surfaced bore which of itself provides a guiding surface for the core member. To this end the sheath includes an internal sheath component indicated generally at 14 which is made up of a plurality of sheath strands arranged in side edge-abutting, long-lay helices, the abutting side edges of the strands being inwardly wedge shaped, or tapered, in transverse cross section.

The sheath strands preferably comprise flat wires of originally rectangular cross section. A suitable stock from which the wires originate may comprise a stainless hard drawn or plated steel wire which provides a hard surface to resist the bearing stresses applied by the components of the core member.

In fabricating the internal sheath component 14, there are employed from 6 to 15 of such flat wires. The use of fewer than six wires results in the fabrication of a very stiff sheath which is not satisfactory for many applications. The use of more than about 15 wires will result in a reduction in sheath tensile strength caused by inward collapse of the wires under stress. Additionally, it will create an internal sheath surface of excessive roughness, which will interfere with the proper action of the inner motion-transmission core member housed within the sheath.

Accordingly, the number of flat wires used to form the annulus is selected as a compromise between bending stiffness of the conduit, tensile capability of the conduit, and smoothness of the bore.

In the fabrication of internal sheath component 14 the selected number of sheath wires 16 are formed into long lay helices and swaged into a cylindrical shell, or annulus. Swaging is performed over a mandrel in a rotary swager. During the swaging operation, the component wires are curved and compacted into their final shape. Also, their side edges become wedge-shaped or inwardly tapered, as is seen particularly in the sectional views of FIGS. 4, and 6–8 inclusive.

The angle of bevel of the wire side edges will be a function of the number of wires employed in the fabrication of the inner sheath member. Thus, where the inner sheath member is a composite of six wires, each of the wires will comprise a 60° included sector of the annulus. Where there are 15 wires in the sheath, each wire will represent a 24° included sector of the annulus.

Although the degree of spiralling of the sheath wires is variable, depending upon such factors as the application to which the actuator is to be put, and the identity and nature of the other actuator components, it is preferred to lay the wires into a helix wherein the individual wires have lay lengths of from 6 to 15 times the outside diameter of the sheath.

The net result of the wire laying and swaging operation is the fabrication of an integral sheath component having a hard, smooth continuous bore fully capable of withstanding the stresses and bearing forces exerted upon it by the action of a contained motion transmission core member of either the sliding or ball bearing classes.

The internal sheath component 14 is maintained in its operative formed condition by the application of at least one binder strand 18. This strand holds the sheath strands together and prevents the outward expansion of the sheath when it is under a compression load.

Binder strand 18 preferably comprises a stiff, strong wire of either rectangular or circular cross section. It is wrapped about the internal sheath component in helical manner and preferably in counter rotation to the strands of the internal sheath component. Also, it is characterized by a lay length which is shorter than the lay lengths of the strands of the sheath component. In a typical instance it may have a lay length of from 1/6 to 3 times the outside diameter of the sheath. As a result, when the sheath is in compression, the stiff, strong, counter-rotated binder wire resists the tendency of the internal sheath strands to expand, thereby preventing buckling of the latter and destruction of the actuator.

If desired, the entire sheath assembly consisting of internal sheath component 14 and binder strand 18 may be housed or contained in an external tube 20 of polyethylene or other plastic. This protects the assembly from damage occasioned by impact. It also seals the actuator against the entrance of moisture.

The sliding motion transmission core member 12 may be variously constituted, but in the illustrated embodiment comprises a stranded wire cable 22 wrapped with a closely spiralled flat wire covering, or armor, 24. The core assembly then may be encased in a plastic tube 26 preferably fabricated from a plastic having self-lubricating characteristics to facilitate sliding of the core member within the external sheath.

The construction of a flexible terminal fitting assembly which may be employed in the use of the actuator is illustrated in FIG. 1A.

The end of sheath 10 is fitted with a ferrule 28, the inner portion of which receives a spiralled sleeve 30 and is swaged to the end of sheath 10. The outer end of ferrule 28 is provided with an outwardly projecting extension 32 having an interior annular detent 34.

Core member 12 extends outwardly through ferrule 28. Its outer end is received in the hollow inner end of a power take-off or application rod 36 and bushing 37. It is secured by swaging or other suitable means.

An external sleeve 38 is coupled to ferrule extension 32 by means of an interlocking, outwardly flared end 40. The end fitting thus permits a certain amount of flexing through a flex angle indicated by the dashed lines and arrows of FIG. 1A, thereby improving the performance of the unit.

FIG. 2 illustrates the application of the novel actuator sheath of the invention to an assembly including a ball-bearing type of motion transmission core member.

In this form of the invention the sheath, indicated generally at 10a, is substantially identical in construction with sheath 10 of the previously described embodiment.

Thus, it includes an internal sheath component 14 comprising a plurality of sheath strands arranged in side edge-abutting, long lay helices with the abutting side edges of the strands being inwardly wedge-shaped in transverse cross section. It also includes a binder wire 18a which is similar in application and function to binder wire 18 previously described, with the exception that it is of circular cross section rather than rectangular. It, too, may include a protective plastic cover 20 of the character and function above described.

The sheath assembly thus constituted houses a ball bearing type motion transmission core member indicated generally at 42. The latter serves the same general purpose as does core member 12 of the previously described embodiment, but incorporates ball bearings, the low friction characteristics of which make possible use of the actuation over great distances.

Core member 42 includes as its power transmission component a flat bar or tape 44 having on its opposite faces continuous, registering, longitudinally extending grooves 46.

Grooves 46 serve as tracks for a plurality of ball bearings 48. These are maintained rotatably in spaced relation by a spiral spring 50.

In the operation of the actuator, ball bearings 48 rotate freely between the convolutions of the spring and track in grooves 46. Their outer surfaces bear against the hard, continuous, inner surface of internal sheath component 14 without the necessity of providing special tracks for this purpose.

The end fitting assembly of the actuator of FIGS. 2 and 4 includes a ferrule 52 and spiralled bushing 54 which are swaged over the outer end of sheath assembly 10a. The ferrule has an outwardly extending terminal portion 56 which is threaded for attachment to an operating element.

A control rod 58 having a cleft inner end is swaged to the outer end of flat bar 44 thereby attaching the motion transmission element to the control rod.

FIGS. 3A and 3B illustrate an embodiment which employs as a power transmission core element a combination of the sliding core element and ball bearing core element above described. It is useful in long run situations in which part of the run is straight and part characterized by bends and turns. The relatively low friction ball bearing type core element is useful in the straight runs where flexing of the actuator in diverse planes is not required. It will be apparent that the ball bearing type actuator including flat bar 44 can flex in the plane of the bar only. However, the sliding type of core member incorporating armored cable 22 is flexible universally in all directions, and hence is used in the devious parts of the run.

Accordingly, the composite actuator of FIGS. 3A and 3B includes a sheath assembly 10 which is identical to that previously described. Along its straight runs it includes a ball bearing type motion transmission core member 42 and along its twisting runs a sliding type motion transmission core member 12 both of which also may be identical with these elements of the actuator assembly, previously described.

The two motion transmission core members are coupled end to end by means of a swiveled connection which includes a first ferrule 60 swaged to the end of the flat bar component 44 of the ball bearing type motion transmission core element 42 and a second ferrule 62 swaged to the end of the sliding type motion transmission core element 12.

The outer end of ferrule 60 has a pocket 64 which receives a head 66 on the adjacent end of ferrule 62 in swivel-forming relation. This prevents the transmission of twists from the section of the actuator containing the universally flexible sliding core element to the section of the actuator containing the ball bearing type core element of limited flexibility.

Alternate forms of ball bearing type motion transmission core elements having special usefulness are illustrated in FIGS. 5 to 7 inclusive.

Whereas the embodiment of FIGS. 2 and 4 utilizes a spiral spring 50 to retain the ball bearings, that of FIGS. 5 and 6 employs for this purpose a pair of perforated metal tapes, indicated generally at 68.

Each tape 68 comprises a stiff, flat metal body 70 having at spaced intervals along its length centrally located, punched out perforations 72. These are defined by side walls having shaped abutments 74 and are dimensioned to receive ball bearings 48 in a retained, freely rotating condition. The ball bearings track in grooves 75 in flat bar 70 and bear against the hard, continuous inner surface of internal sheath component 14. They are held in position by the side walls of perforations 72 and in particular by the abutment portions 74 thereof.

The novel ball bearing type core elements illustrated in FIGS. 7 and 8 are fully flexible in all planes, thereby overcoming the inherent deficiency of the ball bearing type core element of FIGS. 2 and 4 previously described, the flexibility of which is limited to a single plane by the presence of its flat bar component 44.

In the embodiment of FIG. 7, a round rod 76 is substituted for flat bar 44. Rod 76 has in its outer surface three longitudinally extending surface grooves or tracks 78. These are arranged at approximately 120° to each other and are dimensioned to receive ball bearings 48. A spiral spring 50 receives the rod and ball bearings, retaining the latter in spaced freely rotating condition within the annular sheath component.

In the embodiment of FIG. 8 a longitudinally cleft rod 80 is used in place of the solid rod of the embodiment of FIG. 7. The cleft rod is divided into three substantially equal segments 82 having included angles of approximately 120° each. Each segment is provided on its outer surface with a central longitudinally extending groove 83 in which track ball bearings 48, retained in coil spring 50. This form of the invention is even more easily flexed than that of FIG. 7, because of the slip planes present between core rod segments 82.

OPERATION

The operation of the hereindescribed push-pull cable-type actuator is as follows:

In the form of the invention illustrated in FIGS. 1A and 1B, pushing or pulling on rod 36 transmits a corresponding motion to the sliding type motion transmission core member 12 which slides within sheath assembly 10.

In the form of the invention illustrated in FIGS. 2 and 4, pushing or pulling on rod 58 transmits the movement to the ball bearing type motion transmission core member 42. In such motion, ball bearings 48 rotate freely within retaining spring 50 and bear against the smooth, continuous, hard surface of the bore of helically wound sheath component 14.

In the form of the invention illustrated in FIG. 3, actuation of the control rod transmits motion to sliding core member 12, which is universally flexible and is applied in tortuous stretches. Core member 12 in turn transmits the driving force through a swivel connection to low friction ball bearing type core member 42. The latter flexes only in the plane of flat bar 44 and accordingly is applied in long, straight stretches.

In the form of the invention illustrated in FIGS. 5 and 6, application of pushing or pulling force to flat bar 44, produces low friction movement of the bar through long stretches of application because of the action of ball bearings 48 retained in the walled perforations of the perforated tapes 68.

In the form of the invention illustrated in FIGS. 7 and 8, a similar low friction application is obtained using ball bearings tracking in solid rod 76 and split rod 80, respectively, for universally flexible application of the ball bearing type of motion transmission core member.

In all of the forms of the invention, use is made of a simplified construction incorporating an external sheath assembly comprising a plurality of sheath strands arranged in side edge-abutting, long lay helices, the abutting side edges of the strands being inwardly wedge-shaped in transverse cross section as is particularly apparent in FIGS. 4 to 8 inclusive.

This construction imparts a keystone effect to the sheath so that it is inherently strong and resists applied tension forces. Applied compression forces in turn are resisted by the counterrotated binder wire 18 and 18A with which the internal sheath is wrapped.

Other advantages stem from this novel construction. Using it, it is possible to construct a control having very low backlash due to the close tolerances made possible by the method by which the actuator is fabricated. If a plastic coating is employed on the core member, the bearing surface of the plastic sliding on metal is greater than if the metal inner member were sliding inside the plastic tube.

The outside diameter of the plastic coated core member may be made about equal to that of the end fitting. The elimination of a diameter difference at this joint allows the core member to transmit greater compression load without column buckling.

The actuator is particularly well adapted to use employing a combination of ball bearing and sliding type core members. For very long controls, the ball bearing type core member may be employed in straight sections with very little increase in friction. This reduces the cost of the control. Also, use of the armored strand, sliding type core member at each end of the ball bearing core member will allow the associated end fittings to swivel about the actuator center line, a result not possible with actuators including conventional ball bearing type core members.

Having thus described my invention in preferred embodiments, I claim:

1. A push-pull cable-type actuator comprising:
   a. a hollow sheath having a core-guiding inner surface comprising a plurality of sheath strands wedge-shaped in cross section and arranged in side edge-abutting, long lay helices, whereby to prevent their inward collapse, and
   b. a motion-transmission core member mounted for guided longitudinal movement within the sheath.

2. The actuator of claim 1 wherein the sheath comprises from 6 to 15 wire strands shaped into an annulus.

3. The actuator of claim 1 wherein the sheath strands have lay lengths of from 6 to 15 times the outside diameter of the sheath.

4. The actuator of claim 1 wherein the sheath includes at least one binder strand of a shorter lay length than the sheath strands, helically wrapped about the sheath strands in counter-rotation thereto.

5. The actuator of claim 1 wherein the sheath includes at least one binder strand of a shorter lay than the sheath strands, helically wrapped about the sheath strands in counter-rotation thereto, the binder strand having a lay length of from 1/6 to 3 times the outside diameter of the sheath.

6. The actuator of claim 1 wherein the flexible, motion-transmission core member comprises a metal-armored stranded cable.

7. The actuator of claim 1 wherein the flexible motion-transmission core member comprises a plastic sheathed stranded cable.

8. The actuator of claim 1 wherein the flexible, motion-transmission core member comprises a flexible bar having a plurality of perforations spaced along its length and a plurality of ball bearings retained one in each perforation in bearing relation to the sheath.

9. A push-pull, cable-type actuator comprising:
   a. a flexible sheath and
   b. a flexible, motion transmission core member mounted for guided longitudinal movement within the sheath, the core member comprising a round, flexible bar having in its peripheral surface three substantially parallel longitudinal guideways arranged at angles of about 120° to each other, a plurality of ball bearings positioned in the guideways and bearing against the sheath, and ball bearing retaining means mounted on the bar for retaining the ball bearings in longitudinally spaced relation to each other.

10. The actuator of claim 9 wherein the ball bearing retaining means comprises a coil spring receiving the ball bearings between its convolutions.

11. The actuator of claim 9 wherein the bar is divided into three longitudinal segments of substantially equal cross section.

12. A push-pull, cable-type actuator comprising:
   a. a sheath comprising a plurality of sheath wires forming a substantially continuous, smooth bore annulus, the wires being arranged in side edge-abutting, long lay helices, the abutting side edges of the wires being inwardly wedge-shaped in transverse cross section, and
   b. a motion-transmission core member mounted for guided longitudinal movement within the sheath.

13. A push-pull, cable-type actuator comprising:
   a. a sheath comprising a plurality of sheat strands arranged in side edge-abutting, long lay helices, the abutting side edges of the strands being inwardly wedge-shaped in transverse cross section, the sheath being annular in cross section and each strand comprises an included 24° to 60° sector of the annulus, and
   b. a motion-transmission core member mounted for longitudinal movement within the sheath.

14. A push-pull cable-type actuator comprising:
   a. a sheath comprising a plurality of sheath strands arranged in side edge-abutting, long lay helices, the abutting side edges of the strands being inwardly wedge-shaped in transverse cross section, the sheath comprising from 6 to 15 flat metal wires having lay lengths of from 6 to 15 times the outside diameter of the sheath and swaged into a smooth bore annulus the component wires of which each comprise 24° to 60° included sectors of the annulus, and
   b. a motion-transmission core member mounted for guided longitudinal movement within the sheath.

15. A push-pull, cable-type actuator comprising:
   a. a sheath comprising a plurality of sheath strands arranged in side edge-abutting, long lay helices, the abutting side edges of the strands being inwardly wedge-shaped in transverse cross section, the sheath strands comprising from 6 to 15 flat metal wires having lay lengths of from 6 to 15 times the outside diameter of the sheath and swaged into a smooth bore annulus the component wires of which each comprise 24° to 60° included sectors of the annulus, the sheath including at least one binder strand of a shorter lay than the sheath strands, helically wrapped about the sheath strands in counter-rotation thereto, the binder strand having a lay length of from 1/6 to 3 times the outside diameter of the sheath, and a motion-transmission core member mounted for guided longitudinal movement within the sheath.

16. A push-pull, cable-type actuator comprising:
a. a sheath comprising a plurality of sheath strands arranged in side edge-abutting, long lay helices, the abutting side edges of the strands being inwardly wedge-shaped in transverse cross section, and
b. a motion-transmission core member mounted for guided longitudinal movement within the sheath and comprising a ball-bearing mounted flexible bar.

17. A push-pull, cable-type actuator comprising:
a. a sheath comprising a plurality of sheath strands arranged in side edge-abutting, long lay helices, the abutting side edges of the strands being inwardly wedge-shaped in transverse cross section, and
b. a motion-transmission core member mounted for guided longitudinal movement within the sheath and comprising a flexible bar, a coil spring encircling the bar, and a plurality of ball bearings retained in spaced relation in the convolutions of the spring in bearing relation to the sheath.

18. A push-pull, cable-type actuator comprising:
a. a sheath comprising a plurality of sheath strands arranged in side edge-abutting long lay helices, the abutting side edges of the strands being inwardly wedge-shaped in transverse cross section, and
b. a motion-transmission core member mounted for guided longitudinal movement within the sheath and comprising a round, flexible bar having in its peripheral surface three substantially parallel, longitudinal guideways arranged at angles of about 120° to each other, a plurality of ball bearings positioned in the guideways and bearing against the sheath, and ball bearing retaining means mounted on the bar for retaining the ball bearings in longitudinally spaced relation to each other.

19. The actuator of claim 18 wherein the retaining means comprises a coil spring receiving the ball bearings between its convolutions.

20. The actuator of claim 18 wherein the bar is divided into three longitudinal segments of substantially equal cross section.

21. A push-pull, cable-type actuator comprising:
a. a sheath comprising a plurality of sheath strands arranged in side edge-abutting, long lay helices, the abutting side edges of the strands being inwardly wedge-shaped in transverse cross section, and
b. a motion-transmission core member mounted for guided longitudinal movement within the sheath and comprising a length of metal-armored stranded cable, a length of ball bearing-mounted bar, and coupling means coupling the cable and bar in end-to-end relationship to each other.

22. The actuator of claim 21 wherein the coupling means comprises ball and socket coupling means.

* * * * *